(12) United States Patent
Wu et al.

(10) Patent No.: US 9,736,472 B2
(45) Date of Patent: Aug. 15, 2017

(54) MOTION VECTOR PROCESSING

(75) Inventors: Zhuangfei Wu, Danderyd (SE); Thomas Rusert, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 395 days.

(21) Appl. No.: 14/238,494

(22) PCT Filed: May 28, 2012

(86) PCT No.: PCT/SE2012/050569
§ 371 (c)(1),
(2), (4) Date: Feb. 12, 2014

(87) PCT Pub. No.: WO2013/028117
PCT Pub. Date: Feb. 28, 2013

(65) Prior Publication Data
US 2014/0198856 A1    Jul. 17, 2014

Related U.S. Application Data

(60) Provisional application No. 61/525,276, filed on Aug. 19, 2011.

(51) Int. Cl.
*H04N 19/139*    (2014.01)
*H04N 19/50*    (2014.01)
(Continued)

(52) U.S. Cl.
CPC ..... *H04N 19/00684* (2013.01); *H04N 19/103* (2014.11); *H04N 19/105* (2014.11);
(Continued)

(58) Field of Classification Search
CPC ....... H04N 19/139; H04N 19/61; H04N 19/50
(Continued)

(56) References Cited

U.S. PATENT DOCUMENTS

| 2012/0075535 A1* | 3/2012 | Van Beek | H04N 5/145 348/699 |
| 2012/0269269 A1* | 10/2012 | Choi | H04N 19/597 375/240.16 |
| 2014/0078254 A1* | 3/2014 | Lin | H04N 19/597 348/43 |

FOREIGN PATENT DOCUMENTS

JP    2009510892 A    3/2009

OTHER PUBLICATIONS

Gou, Xun, et al. "Inter-View Direct Mode for Multiview Video Coding." IEEE Transactions on Circuits and Systems for Video Technology. vol. 16, No. 12. Dec. 2006. 1527-1532.
(Continued)

*Primary Examiner* — William C Vaughn, Jr.
*Assistant Examiner* — Jae N Noh
(74) *Attorney, Agent, or Firm* — Murphy, Bilak & Homiller, PLLC

(57) ABSTRACT

The embodiments relates to motion vector prediction and decoding for multi-view video content from multiple camera views (10, 20). At least one candidate motion vector predictor (54, 64) is provided for a current motion vector (34) to be encoded. A motion vector predictor is then determined from the at least one candidate motion vector predictor (54, 64) multiplied by a respective scaling factor determined based on baseline distances between camera views (10, 20). Correspondingly, during decoding a motion vector (34) is determined for a current pixel block (30) based on a motion vector predictor (determined for the current pixel block (30).

22 Claims, 10 Drawing Sheets

(51) Int. Cl.
  *H04N 19/51*   (2014.01)
  *H04N 19/597*  (2014.01)
  *H04N 19/56*   (2014.01)
  *H04N 19/105*  (2014.01)
  *H04N 19/52*   (2014.01)
  *H04N 19/513*  (2014.01)
  *H04N 19/103*  (2014.01)
  *H04N 19/109*  (2014.01)
  *H04N 19/573*  (2014.01)
  *H04N 19/577*  (2014.01)

(52) U.S. Cl.
  CPC ........... *H04N 19/109* (2014.11); *H04N 19/51* (2014.11); *H04N 19/513* (2014.11); *H04N 19/52* (2014.11); *H04N 19/56* (2014.11); *H04N 19/573* (2014.11); *H04N 19/577* (2014.11); *H04N 19/597* (2014.11)

(58) Field of Classification Search
  USPC .................................................... 375/240.16
  See application file for complete search history.

(56) References Cited

OTHER PUBLICATIONS

Jung, Joel. "Competition-Based Scheme for Motion Vector Selection and Coding." ITU—Telecommunications Standardization Sector. Video Coding Experts Group (VCEG). VCEG-AC06. 29th Meeting. Klagenfurt, Austria. Jul. 17-18, 2006. 1-7.

Koo, Han-Suh, et al. "MVC Motion Skip Mode." Joint Video Team (JVT) of ISO/IEC MPEG & ITU-T VCEG. JVT-W081. 23rd Meeting. San Jose, California. Apr. 21-27, 2007. 1-13.

Laroche, Guillaume, et al. "RD Optimized Coding for Motion Vector Predictor Selection." IEEE Transactions on Circuits and Systems for Video Technology. vol. 18, No. 12. Dec. 2008. 1681-1691.

Li, Dong, et al. "Enhanced Block Prediction in Stereoscopic Video Coding." IEEE 2011. 1-4.

Ryu, Seungchul, et al. "Adaptive Competition for Motion Vector Prediction in Multi-view Video Coding." IEEE 2011. 1-4.

Tourapis, Alexis Michael, et al. "Direct Mode Coding for Bipredictive Slices in the H.264 Standard." IEEE Transactions on Circuits and Systems for Video Technology. vol. 15, No. 1. Jan. 2005. 119-126.

Unknown, Author, "Information Technology—Coding of Audio-Visual Objects—Part 10: Advanced Video Coding." International Standard. ISO/IEC 14496-10. 2010. 1-704.

Park, Seungwood et al., "A study on simplification of spatial/temporal MVP scaling (CE9 SP01+SP06S2+SP07)", Joint Collaborative Team on Video Coding (JCT-VC) of ITU-T SG16 WP3 and ISO/IEC JTC1/SC29/WG11, Document JCTVC-F089, 6th Meeting: Torino, IT, Jul. 14-22, 2001, 1-9.

* cited by examiner

MOTION VECTOR PROCESSING

TECHNICAL FIELD

The present embodiments generally relate to processing of motion vectors, and in particular to prediction and decoding of such motion vectors.

BACKGROUND

H.264, also denoted Moving Picture Experts Group-4 (MPEG-4) Advanced Video Coding (AVC), is the state of the art video coding standard. It is a hybrid codec which takes advantages of eliminating redundancy between frames and within one frame and uses a number of compression techniques that give good compression efficiency. The output of the encoding process is video coding layer (VCL) data which is further encapsulated into network abstraction layer (NAL) units prior to transmission or storage.

H.264 is block-based, i.e. a video frame is processed in macroblock (MB) units, which are 16×16 pixel blocks that may be further divided into sub-macroblocks (sMB). In order to minimize the amount of data to be coded, a technology called motion compensation (MC) is done on each non-intra pixel block which uses previously reconstructed pixel values in neighboring frames to predict the pixel values of the current pixel block at its best effort. To get a prediction for the current pixel block, an area that is similar to current pixel block in the reference frame is signaled in the bitstream. Final reconstruction can be made by adding the predicting pixel values together with the residue pixel values. In order to find a best match of current pixel block in a reference frame, motion search is usually done at the encoder side. It tries to find lowest sum of squared differences (SSD) or sum of absolute differences (SAD) between the current pixel block and possible reference pixel blocks. The outcome of the motion search is a reference index signaling which reference frame it refers to and an offset vector called motion vector (MV) pointing to the reference area. MV is an important and consuming component in the video bitstream. For video coded with high Quantization Parameter (QP), it can take up to over 50% of the bitrate.

Motion Vector Coding

MVs are not directly coded into bitstream since there are redundancies to exploit between MVs. Neighboring MVs often have high correlations and MVs with similar length and direction are often clustering together. These clustered MVs could correspond to local motion where an object is moving or global motion where there is a panning. For each MV to be coded, a MV prediction is done first to reduce the amount of data so that only the difference between the MV and the MV predictor is coded. In H.264, a median predictor is generated by taking the median value of the MVs from the pixel block to the left, above and top-right. The process is done for the horizontal and vertical MV component respectively.

Multi-View Video Coding (MVC)

While "traditional" video services provide video in a single representation, i.e. fixed camera position, multi-view video representations has recently gained significant importance. A multi-view representation represents the content from different camera perspectives or views, a particular case being the "stereoscopic video" case, where the scene is captured from two cameras that have the same or a similar distance as the human eye. Using suitable display technologies to present the "stereoscopic" content to the viewer, perception of depth can be provided to the viewer.

MVC is a video coding standard that can be used to compress multi-view video representations. High compression efficiency is achieved by eliminating redundant information between different layers. MVC is based on the AVC standard and consequently MVC shares most of the AVC structure.

MVC Reference Picture List

The major difference between MVC and AVC is the reference picture list handling process. A reference picture list is a collection of pictures that can be used for prediction. They are normally sorted in an order based on how close they are to the current frame. In AVC, all the reference pictures in the list are from the same view. In MVC, apart from reference pictures from the same view, there are also reference pictures from other views. Hence the first step of MVC reference picture list construction process is exactly the same as in AVC, and the difference lies in that inter-view reference pictures are appended afterwards. Due to complexity consideration, it is only allowed to add frames at the same instance in time from other views to the list in MVC.

High Efficiency Video Coding (HEVC)

HEVC is a next generation video coding standard that is currently under standardization process. HEVC aims to substantially improve coding compared to AVC, especially for high resolution video sequences. The initial focus of the HEVC development is on mono video, i.e. a single view.

Motion Vector Competition

Median MV predictor in H.264 is not so efficient in many cases. VCEG Contribution [1] described a new technology denoted as motion vector competition. The key concept of this technology is to take the MV from the neighboring pixel blocks which are often highly correlated to the current MV to form a list of candidate MVs, where neighboring pixel blocks can be either spatial neighbors, i.e. same frame, or temporal neighbors, i.e. different frames. These candidate MVs are scaled according to their temporal distance to their respective reference frames. Only one candidate MV from the list is selected to be the predictor based on rate-distortion (RD) criteria, and the corresponding index entry to the list is transmitted in the bitstream. Motion vector competition in general improves video coding performance as compared to median MV prediction and is therefore suggested for usage in HEVC.

In motion vector competition, the selected candidate MVs generally need to be scaled before being put into the candidate list since it does not necessarily have the same reference distance as the reference distance of the current pixel block for which the MV prediction is made. The term "reference distance" refers to the difference of picture order count (POC) between the frame with the MV and the frame that the MV points to. In FIG. 1, there are seven frames marked by POC 0-6 which is the display order of a video sequence. In the example, frames with POC equal to 0, 1, 3, 4, 5, 6 are already coded frames. Frame with POC=2 is the current frame that is to be coded, and the pixel block in the middle of frame 2 is the current pixel block where the pixel blocks above it are already coded. The current pixel block is testing inter prediction mode which uses reference areas from frame 0 as reference. Three candidate MV predictors are shown in the figure, they are MV B from a spatial neighboring pixel block in the current frame, and MV A and C from temporal collocated blocks before and after the current frame respectively. A scaling factor is used on these candidate MV predictors before they are adopted into the candidate list. The scaling factor formula is:

$$\text{scaling} = \frac{CurrDistance}{RfDistance} = \frac{CurrPOC - CurrRfPOC}{RfPOC - RfRfPOC}$$

In FIG. 1, CurrDistance=2−0=2. RfDistance equals to 1−0=1, 2−0=2 and 3−6=−3 for MV A, B and C respectively. Therefore the scaling factors for MV A, B and C are 2/1=2, 2/2=1 and −2/3 respectively. Each candidate MV predictor is scaled up or down according to the calculated scaling factor. These scaled MV predictors are shown at the bottom of FIG. 1.

The motion vector competition described above and proposed for HEVC work well for mono video. However, when applying motion vector competition to multi-view sequences in HEVC or indeed MVC problems can occur.

For instance, when applying motion vector competition to a multi-view video sequence, a motion vector can point to a frame with the same POC but in another view or a candidate MV predictor could point to a frame with the same POC in another view. In these cased, the numerator and the denominator, respectively, of the above presented scaling formula is zero. This results in a zero scaling factor or an indefinite scaling factor, respectively.

Furthermore, suboptimal compression performance can occur when selecting candidate MV predictors when having the possibility of using not only spatially and temporally neighboring candidate MV predictors but also MVs from other views.

There is, thus, a need for an efficient handling of motion vectors that is adapted for usage in connection with multi-view video.

SUMMARY

It is an objective to provide an efficient handling of motion vectors for multi-view video.

An aspect of the embodiments defines a method of motion vector prediction for multi-view video coding of video content from multiple camera views. The method comprises estimating a motion vector for a current pixel block in a current frame of a current camera view. The motion vector identifies a reference pixel area in a reference frame of a reference camera view that is different from the current camera view. At least one candidate motion vector predictor associated with a pixel block in a first frame of a first camera view and identifying a pixel area in a first reference frame of a first reference camera view different from said first camera view is provided. The method further comprises determining a scaling factor for the at least one candidate motion vector predictor based on a baseline distance between the current camera view and the reference camera view and a baseline distance between the first camera view and the first reference camera view. A scaled candidate motion vector predictor is determined for the at least one candidate motion vector predictor based on the candidate motion vector predictor multiplied by the scaling factor. A motion vector predictor is determined for the motion vector based on the at least one scaled candidate motion vector predictor.

This aspect of the embodiments further defines a device for motion vector prediction for multi-view video coding of video content from multiple camera views. The device comprises a motion vector estimator configured to estimate a motion vector for a current pixel block in a current frame of a current camera view. The motion vector identifies a reference pixel area in a reference frame of a reference camera view that is different from current camera view. A predictor provider is configured to provide at least one candidate motion vector predictor associated with a pixel block in a first frame of a first camera view and identifying a pixel area in a first reference frame of a first reference camera view different from the first camera view. The device also comprises a scaling factor determiner configured to determine a scaling factor for the at least one candidate motion vector predictor based on a baseline distance between the current camera view and the reference camera view and a baseline distance between the first camera view and the first reference camera view. A scaled predictor determiner is configured to determine a scaled candidate motion vector predictor for the at least one candidate motion vector predictor based on the candidate motion vector predictor multiplied by the scaling factor. A predictor determiner is configured to determine a motion vector predictor for the motion vector based on the at least one scaled candidate motion vector predictor.

The present aspect of the embodiments also defines a computer program for predicting motion vectors for multi-view video coding of video content from multiple camera views. The computer program comprises code means which when run on a computer causes the computer to estimate a motion vector for a current pixel block in a current frame of a current camera view. The motion vector identifies a reference pixel area in a reference frame of a reference camera view different from the current camera view. The computer is caused to provide at least one candidate motion vector predictor associated with a pixel block in a first frame of a first camera view and identifying a pixel area in a first reference frame of a first reference camera view that is different from the first camera view. The computer is further caused to determine a scaling factor for the at least one candidate motion vector predictor based on a baseline distance between the current camera view and the reference camera view and a baseline distance between the first camera view and the first reference camera view. The computer is further caused to determine a scaled candidate motion vector predictor for the at least one candidate motion vector predictor based on the candidate motion vector predictor multiplied by the scaling factor and determine a motion vector predictor for the motion vector based on the at least one scaled candidate motion vector predictor.

A related aspect of the embodiments defines a method of motion vector decoding for encoded multi-view video from multiple camera views. The method comprises providing a reference frame index for a current pixel block in a current frame of a current camera view. The reference frame index identifies a reference frame of a reference camera view that is different from the current camera view. At least one candidate motion vector predictor associated with a pixel block in a first frame of a first camera view and identifying a pixel area in a first reference frame of a first reference camera view different from the first camera view is identified for the current pixel block. The method also comprises determining a respective scaling factor based on a baseline distance between the current camera view and the reference camera view and a baseline distance between the first camera view and the first reference camera view for the at least one candidate motion vector predictor. A candidate list comprising at least one scaled candidate motion vector predictor formed based on the at least one candidate motion vector predictor multiplied by the respective scaling factor is generated. The method further comprises determining a motion vector for the current pixel block based on a scalded candidate motion vector predictor of the candidate list.

This related aspect of the embodiments further defines a device for motion vector decoding for encoded multi-view video from multiple camera views. The device comprises an index provider configured to provide a reference frame index for a current pixel block in a current frame of a current camera view. The reference frame index identifies a reference frame of a reference camera view that is different from the current camera view. A predictor identifier is configured to identify at least one candidate motion vector predictor associated with a pixel block in a first frame of a first camera view and identifying a pixel area in a first reference frame of a first reference camera view different from the first camera view for the current pixel block. The device also comprises a scaling factor determiner configured to determine a respective scaling factor for the at least one candidate motion vector predictor based on a baseline distance between the current camera view and the reference camera view and a baseline distance between the first camera view and the first reference camera view. A list generator is configured to generate a candidate list comprising at least one scaled candidate motion vector predictor formed based on the at least one candidate motion vector predictor multiplied by the respective scaling factor. The device further comprises a vector determiner configured to determine a motion vector for the current pixel block based on a scaled candidate motion vector predictor of the candidate list.

The present related aspect of the embodiments also defines a computer program for decoding motion vectors for encoded multi-view video from multiple camera views. The computer program comprises code means which when run on a computer causes the computer to provide a reference frame index for a current pixel block in a current frame of a current camera view. The reference frame index identifies a reference frame of a reference camera view different from the current camera view. The computer is caused to identify at least one candidate motion vector predictor associated with a pixel block in a first frame of a first camera view and identifying a pixel area in a first reference frame of a first reference camera view different from the first camera view for the current pixel block. The computer is also caused to determine a respective scaling factor based on a baseline distance between the current camera view and the reference camera view and a baseline distance between the first camera view and the first reference camera view for the at least one candidate motion vector predictor. The computer is further caused to generate a candidate list comprising at least one scaled candidate motion vector predictor formed based on the at least one candidate motion vector predictor multiplied by the respective scaling factor and determine a motion vector for the current pixel block based on a scaled candidate motion vector predictor of the candidate list.

Determining the scaling factors for the candidate MV predictors to be based on and proportional to the baseline distance for a varying baseline distance scenario improves the coding efficiency of the motion vectors.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

The present embodiments generally relate to the processing of motion vectors and in particular to motion vector prediction for multi-view video coding and motion vector decoding for encoded multi-view video. Thus, the embodiments enable an efficient and accurate motion vector prediction and decoding in applications where multiple camera views are present for recording scenes from different views.

The embodiments can advantageously be applied to the previously described HEVC standard using multi-view video coding and decoding. In addition, the embodiments can also be used in connection with other multi-view video coding and decoding standards and schemes utilizing motion vector prediction. For instance, the embodiments can be used in connection with MVC in order to enable motion vector prediction and decoding. The embodiments are advantageously used as a complement to motion vector competition in order to enable usage of motion vector competition also for multi-view video coding and decoding.

The embodiments as disclosed herein are, however, not limited to HEVC, MVC or indeed motion vector competition. In clear contrast, the embodiments can be used to predict and decode motion vectors in connection with any multi-view video application.

In traditional video coding with only one view, motion vectors are used in the context of pixel prediction from a reference frame at a reference point in time to a current frame at a current point in time. In the same sense, the term motion vector is sometimes used in video coding with multiple views to refer to prediction from a reference frame in a current view to a current frame in the current view, i.e. "pure temporal prediction". In the context of pixel prediction from a reference view at a current point in time to a current view at the current point in time ("pure inter-view prediction"), the term "disparity vector" is sometimes used. Herein, the term "motion vector" is used both in the context of "pure temporal prediction", "pure inter-view prediction", and combinations thereof, i.e. including in the context of pixel prediction from a reference view at a reference point in time to a current view at a current point in time.

Figure 1:
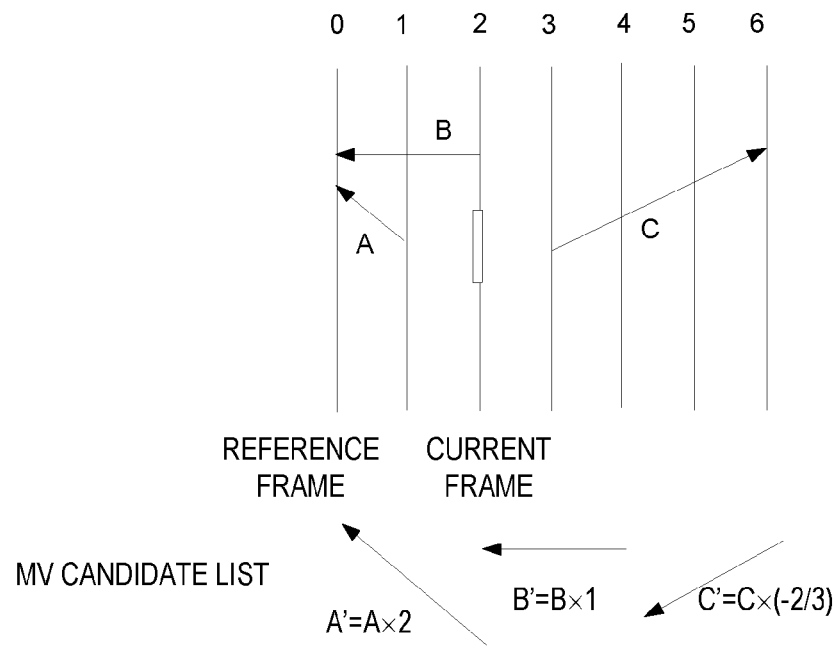
FIG. 1 schematically illustrates the concept of calculating scaling factors for motion vector candidates using motion vector competition.
Figure 2:
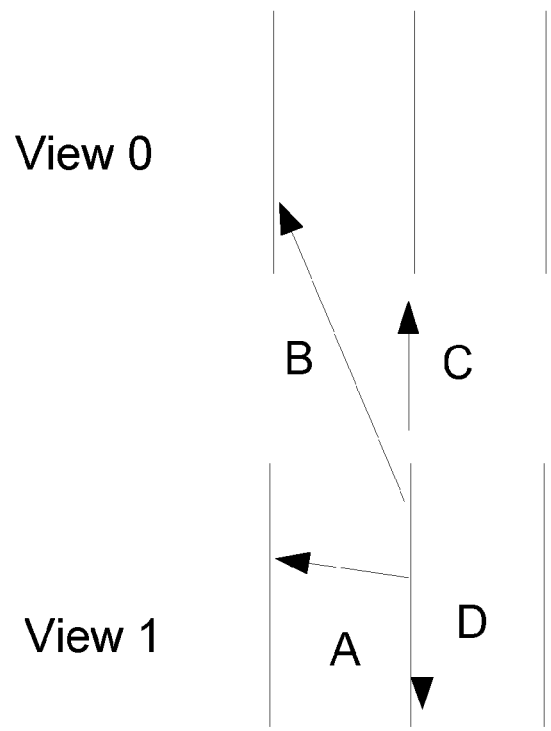
FIG. 2 schematically illustrates the concept of having different motion vector types.

When applying motion vector prediction in connection with multi-view video coding, such as doing the previously mentioned motion vector competition, various types of motion vectors are possible. This is schematically illustrated in FIG. 2. The motion vector A in FIG. 2 points from a current frame towards a reference frame backward in time (or forward in time) in a current view. This corresponds to a so-called temporal motion vector type and it generally represents a true motion of video content. Motion vector C points to a reference frame at the point of time as the current frame but in another camera view. This is a so-called inter-view motion vector type and generally represents the disparity between the two views, i.e. view 0 and view 1. Motion vector B points to a reference frame at a different point of time as compared to the current frame but also in another camera view. This motion vector typically represents a combination of true motion and disparity and could be regarded as being of both the temporal and the inter-view motion vector type. A further optional variant is a so-called spatial motion vector type represented by the motion vector D, which points to coded pixel area in the current frame itself. Such a motion vector type can be considered to represent a repetitive pattern.

Figure 3:
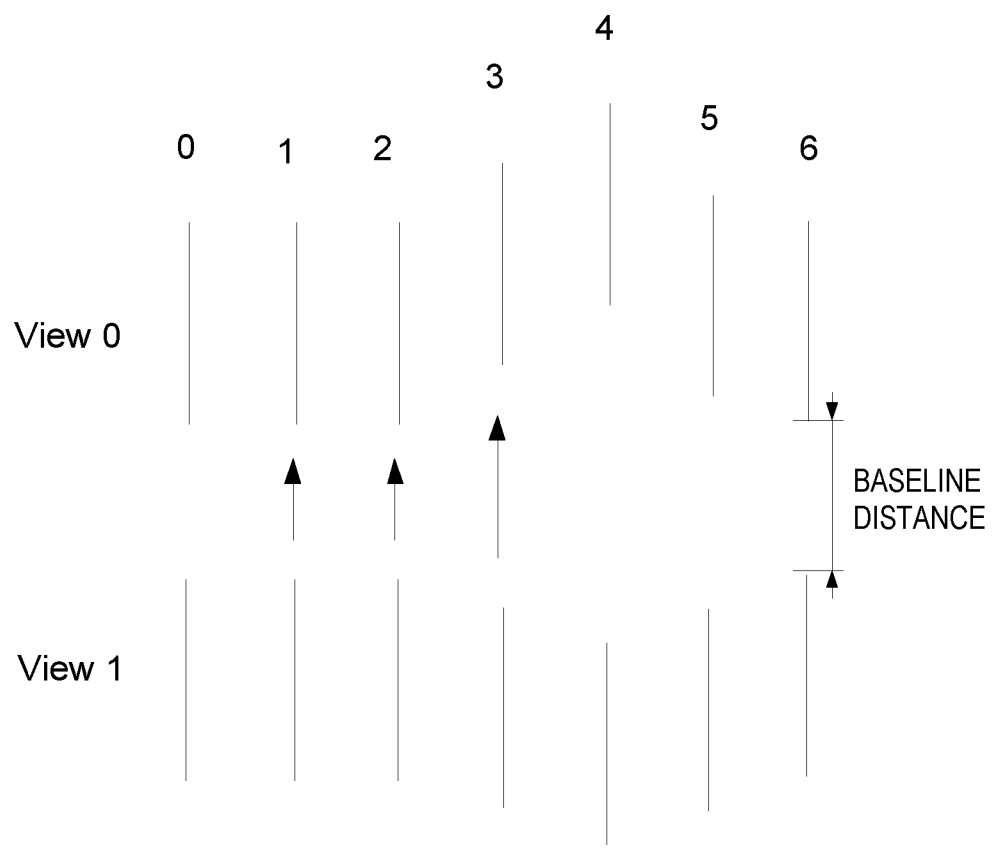
FIG. 3 illustrates a set of changing baseline distances between camera views.

A problem of motion vector prediction in multi-view video is that an inter-view motion vector is highly related to the baseline distance between camera views. FIG. 3 illustrates this concept. In this example the baseline distances are changing for a stereoscopic representation, i.e. having two camera views. The baseline distances are the same for frame 0, 1, 2. It begins to increase at frame 3 and peaks at frame 4 and finally drops back to the previous distance at frame 6. Disparity is usually proportional to baseline distances. Thus, when the baseline distance is multiplied by a certain factor, the corresponding disparity is likely to also be multiplied by the same factor. Hence, when an inter-view motion vector in frame 3 needs to be predicted from another inter-view motion vector in frame 2, it would be advantageous to scale the motion vector predictor by a factor that reflects the amount that the baseline distance scales. This is achieved in an aspect of the embodiments as disclosed in the flow diagram of FIG. 4.

Figure 4:
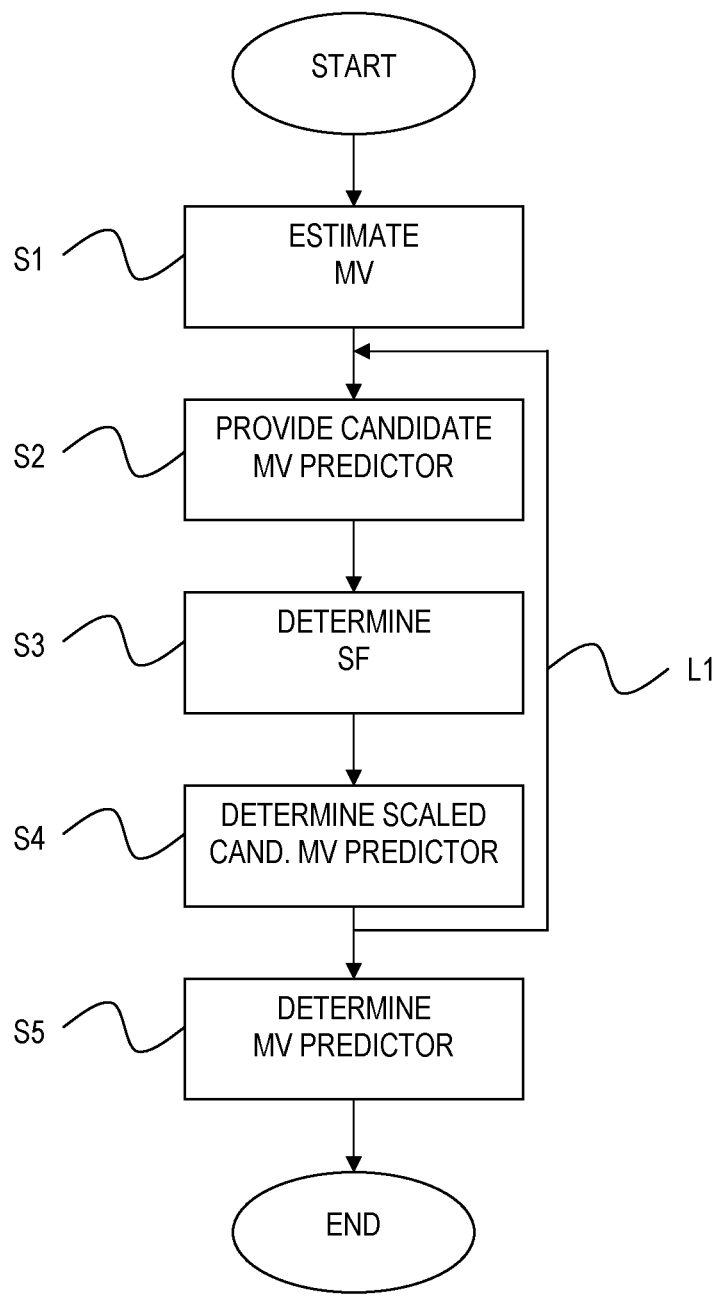
FIG. 4 is a flow diagram illustrating a method of motion vector prediction according to an embodiment.
Figure 7:
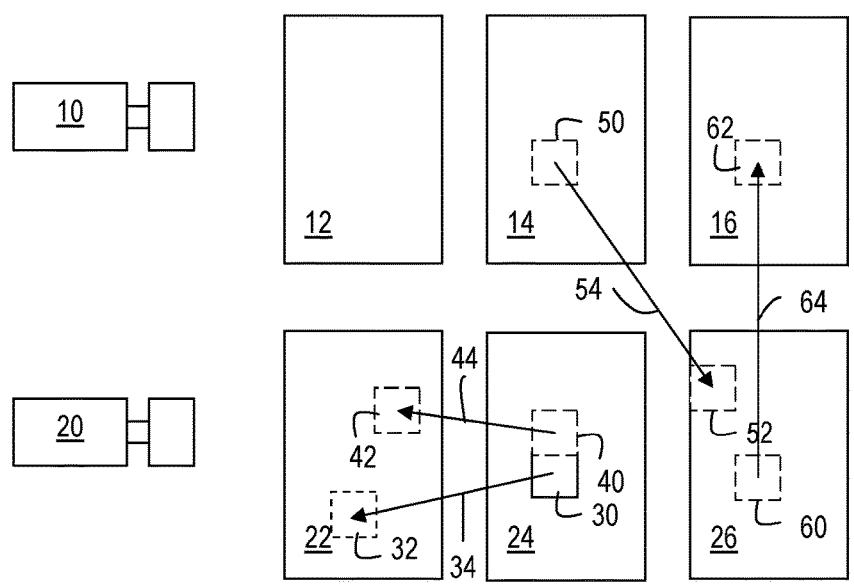
FIG. 7 illustrates motion vector prediction according to an embodiment for a multi-view video stream.

FIG. 4 is a flow diagram illustrating a method of motion vector prediction according to this aspect. The motion vector prediction as disclosed in FIG. 4 is applied to multi-view video coding of video content from multiple, i.e. at least two, camera views 10, 20, see FIG. 7. FIG. 7 illustrates an example of multi-view video coding with two camera views 10, 20 each recording a series of frames 12, 14, 16, 22, 24, 26 comprising pixel blocks 30, 40, 50, 60. In FIG. 7, reference numbers 40, 50, 60 denote already encoded pixel blocks for which a respective motion vector 44, 54, 64 pointing towards a respective pixel area 42, 52, 62 already are estimated.

In a general embodiment, the method comprises estimating, in step S1 and for a current pixel block 30 in a current frame 24 of a current camera view 20 of the multiple camera views 10, 20, a motion vector 34 identifying a reference pixel area 32 in a reference frame 22 of a reference camera view 20 of the multiple camera views 10, 20. In a particular embodiment, the current camera view 20 is different from the reference camera view 20. At least one candidate motion vector predictor 54, 64 associated with a pixel block 50, 60 in a first frame 14, 26 of a first camera view 10, 20 of the multiple camera views 10, 20 is provided in step S2. This candidate motion vector predictor 54, 64 identifies a pixel area 52, 62 in a first reference frame 26, 16 of a first reference camera view 20, 10 of the multiple camera views 10, 20. In a particular embodiment, the first camera view 10, 20 is different from the first reference camera view 20, 10. The method also comprises determining, in step S3, a scaling factor, for the at least one candidate motion vector predictor 54, 64, based on a baseline distance between the current camera view 20 and the reference camera view 20 and a baseline distance between the first camera view 10, 20 and the first reference camera view 20, 10. The method further comprises determining, in step S4 and for the at least one candidate motion vector predictor 54, 64, a scaled candidate motion vector predictor based on the candidate motion vector predictor 54, 64 multiplied by the scaling factor. Finally a motion vector predictor is determined in step S5 for the motion vector 34 based on the at least one scaled candidate motion vector predictor.

Various implementation embodiments of this general embodiment will now be further described herein.

The method of FIG. 4 starts in step S1 where a motion vector 34 is estimated or predicted for a current pixel block 30 to be encoded in a current frame 24 of a current camera view 20. The motion vector 34 is, for instance, estimated according to prior art techniques in a motion vector estimation or search procedure. Such a motion vector estimation preferably involves comparing the pixel values of the current pixel block 30 with the pixel values in different candidate pixel areas. The candidate pixel area that leads to a smallest pixel value difference, such as giving the lowest SSD or SAD between the current pixel block 30 and the candidate pixel areas, is then selected as reference pixel area 32 for the current pixel block 30. This reference pixel area 32 is then identified, at least partly, by a motion vector 34 and optionally by a frame index. Thus, the motion vector 34 estimated in step S1 identifies a reference pixel area 32 in a reference frame 22 for the current pixel block 30. The reference frame 22 can be a frame of the same current camera view 20 as the current pixel block 30 but then in a previous frame 22 (or indeed in a following frame 26) of the current camera view 20, see FIG. 7. Alternatively, the reference frame belongs to a different camera view 10 of the multiple camera views 10, 20. Although, less common the reference frame could in fact be the current frame 24.

In a particular embodiment the current camera view 20 is different from the reference camera view.

According to the embodiments, the motion vector 34 predicted in step S1 is not encoded in the bitstream directly. In clear contrast a motion vector (MV) predictor 54, 64 is determined for the motion vector 34 and only the difference or residual between the MV predictor 54, 64 and the motion vector 34 needs to be encoded. This generally leads to more efficient encoding by exploiting redundancies between motion vectors. The following steps S2 to S5 are performed for the motion vector 34 in order to find an optimal MV predictor 54, 64.

A next step S2 provides at least one candidate MV predictor 54, 64 for the motion vector 34. Each such candidate MV predictor 54, 64 is associated with a respective pixel block 50, 60 in a respective first frame 14, 26 of a respective first camera view 10, 20 and identifies a respective pixel area 52, 62 in a respective first reference frame 26, 16 of a respective first reference camera view 20, 10. In a particular embodiment the first camera view 10, 20 is different from the first reference camera view 20, 10.

The step S2 can be performed according to various embodiments. In an embodiment, the particular candidate MV predictors 54, 64 are preferably provided at least partly based on the position of the current pixel block 30 in the current frame 24. In a particular embodiment, step S2 involves determining a set of multiple candidate MV predictors 44, 54, 64 for the current motion vector 34 and where this set determination is performed based on the position of the current pixel block 30. Furthermore, the set of multiple candidate MV predictors 44, 54, 64 is preferably determined also based on the point in time of the current frame 24 and the identifier or number of the current camera view 20 in addition to the position of the current pixel block 30.

The set of multiple candidate MV predictors 44, 54, 64 could include both spatial candidate MV predictors, temporal candidate MV predictors 44, spatio-temporal candidate MV predictors 54 and inter-view candidate MV predictors 54, 64. Examples of how selecting the former ones are disclosed in document [1]. Thus, the determination of the set of multiple candidate MV predictors 44, 54, 64 is preferably performed based on at least one of i) motion vectors 44 associated with spatially neighboring pixel blocks 40 in the current frame 24, ii) motion vectors 64 associated with temporally neighboring pixel blocks 62 in frames 26 different from the current frame 24 but belonging to the current camera view 20, iii) motion vectors 54 associated with pixel blocks 50 in frames 14 belonging to camera views 10 different from the current camera view 20 but having a respective point in time equal to the point in time of the current frame 24. In a particular embodiment also iv) motion vectors associated with pixel blocks in frames belonging to camera views different from the current camera view and having a respective point in time different from the point in time of the current frame could be available when determining the set. In a particular embodiment, the set comprises at least candidate MV predictors selected from ii) and iii) above.

In another embodiment, the provision of candidate MV predictors 54, 64 in step S2 is limited to only those candidate MV predictors, such as of the above-mentioned set, that are of the same MV type as the motion vector 34 predicted in step S1.

When providing candidate MV predictors 54, 64 for a current motion vector 34, such as a part of motion vector competition, non-optimal MV predictors can be selected if no limitation is imposed in the provision of the candidate MV predictors. For instance, a motion vector of inter-view MV type pointing to a frame with same point in time but in another camera view usually represents a pixel disparity since the two frames are captured at the same time where no motions are involved. In this case, it is typically not appropriate to use candidate MV predictors of the inter-view motion vector type when a current pixel block to be encoded has a motion vector pointing to pixel area in a previous or following reference frame of the same camera view as the current frame. The reason for this is that a motion vector of the inter-view MV type typically has no correlation with a motion vector of the temporal MV type. Hence, the result could then be suboptimal compression performance since the "optimal" MV predictor for the current motion vector is not selected.

In this particular embodiment, the method of FIG. 4 additional comprises determining the MV type for the motion vector 34 predicted in step S1. The MV type is determined from multiple predefined MV types. The determination of MV type in step S2 is then performed based on the current camera view 20 and the camera view 20 of the reference frame 22, denoted (current) reference camera view herein. Alternatively or in addition, the determination of MV type is performed based on a point in time of the current frame 24 and the point in time of the reference frame 22. In the former case, the view numbers or identifiers of the current camera view 20 and the reference camera view 20 are compared. If they are different the motion vector points to the pixel area in the reference frame of a different camera view than the current camera view 20. The motion vector is then of the so-called inter-view MV type. If the view identifiers are not different the reference frame 22 instead belongs to the same camera view 20 as the current view 20 and the motion vector 34 estimated in step S1 is not of the inter-view MV type. Correspondingly, if the points in time of the current frame 24 and the reference frame 22 are different, the motion vector 34 predicted in step S1 points to a frame backwards or forwards in time relative the current frame 24. The motion vector 34 is then of the so-called temporal MV type.

Step S2 then involves providing at least one, preferably multiple, candidate MV predictors 44, 54 for the current motion vector 34. According to these embodiments, this at least one candidate MV predictor 44, 54, 64 is selected to be of the determined MV type determined. Thus, the candidate MV predictors 44, 54, 64 provided for the current motion vector 34 are preferably of the same MV type as the current motion vector 34.

In an embodiment, step S2 could identify those candidate MV predictors 44, 54, 64 of the determined set that are of the same MV type as the current motion vector 34. In an embodiment, only these identified candidate MV predictors 44, 54, 64 of the set are employed and thereby discarding any candidate MV predictors of the set that are of a MV type different from the MV type of the current motion vector 34.

As mentioned in the foregoing, in an embodiment the current camera view and the reference camera view are different camera views of the multiple camera views. In such a case, the motion vector predicted in step S1 for the current pixel block is of the so-called inter-view type or comprises at least one inter-view disparity component.

Categorizing and classifying motion vectors in different MV types and restricting candidate MV predictor selection based on MV types reduces the amount of candidate MV predictors that need to be evaluated. This implies reduced complexity. At the same time, coding efficiency can be improved since a reduced number of candidates results in smaller total amount of entries to be indexed so a shorter codeword can be assigned to represent the index and MV predictor selection.

A next step S3 of the method determines a scaling factor for the at least one candidate MV predictor provided in step S2. According to the embodiments the scaling factor is determined based on a baseline distance between the current camera view and the reference camera view and the baseline distance between the first camera view and the first reference camera view. It could be possible that the baseline distances are changing and thereby different at different point of times as disclosed in FIG. 3. Hence the baseline distance between the current camera view and the reference camera view is preferably the current baseline distance as determined at the point in time for the current frame. Correspondingly, the baseline distance between the first camera view and the first reference camera view is preferably the baseline distance as determined at the point in time for the first frame.

A next step S4 determines a scaled candidate MV predictor for the current candidate MV predictor based on the candidate MV predictor and the scaling factor determined in step S3. In a particular embodiment, the scaled candidate MV predictor is determined based on and preferably equal to the candidate MV predictor multiplied by the scaling factor. The scaled candidate MV predictor is thereby typically an upscaled or downscaled version of the candidate MV predictor, possibly pointing at an opposite direction as compared to the candidate MV predictor.

The loop of steps S2 to step S4 is then preferably repeated for all candidate MV predictors, which is schematically illustrated by the line L1. Thus, in such a case a respective scaling factor is preferably determined for each candidate MV predictor provided for the current motion vector. These scaling factors are then employed in step S4 to scale the respective candidate MV predictors up or down by multiplying each candidate MV predictor with its respective scaling factor.

Finally step S5 determines a MV predictor for the current motion vector based on the at least one scaled candidate MV predictor obtained from step S4.

The particular scaled candidate MV predictor to use as MV predictor can be determined, for instance, based on a rate-distortion criterion that reflects the trade-off between the additional cost of signaling the selected MV predictor and the gain obtained with a more accurate MV prediction. Examples of such rate-distortion criteria that can be used according to the embodiments are presented in section 3.1.2 of document [1], the teaching of which with regard to suitable rate-distortion criteria is hereby incorporated by reference. Other criteria than ratio-distortion criteria are also possible to use when determining the MV predictor in step S5, such as pure quality metrics, e.g. SSD or SAD.

A motion vector comprises an x coordinate or a horizontal component and a y coordinate or a vertical component. The method of FIG. 4 can then be used in a combined process to find a motion vector predictor for both vector components. In an alternative approach, the two components are handled separately. In such a case, steps S2 to S5 of FIG. 4 can be done sequentially or in parallel for each respective vector component. In such a case, the result of the method is a first MV predictor for the horizontal component and a second MV predictor for the vertical component of the motion vector.

The MV predictor determined in step S5 for the current motion vector may then used to calculate a residual motion vector. Thus, the residual motion vector is calculated based on the motion vector and the MV predictor and preferably as a difference therebetween.

In other embodiments, such as in the skip mode no residual motion vector is calculated. Thus, in the skip mode the decoder will use the MV predictor determined for a current pixel block without any MV difference or residual to refine the motion vector for that pixel block.

In some rare cases it could happen that no appropriate candidate MV predictor is available. Thus, all candidate MV predictors of the set are of MV types different from the MV typed determined for the current pixel block and motion vector. In such a case, a default MV predictor could be used instead. A typical example of such a default MV predictor could be the zero vector (0, 0).

In a particular embodiment, the determination of the scaling factor in step S3 comprises determining the scaling factor based on a quotient between the baseline distance between the current camera view and the reference camera view and the baseline distance between the first camera view and the first reference camera view.

In rare cases it might happen that the baseline distance between the current camera view and the reference camera view or the baseline distance between the first camera view and the first reference camera view is zero. This could then, if the scaling factor is determined based on a quotient of the baseline distances, result in a zero or infinite scaling factor. In such cases, the scaling factor is preferably determined to be equal to a fixed predefined value, such as one. Hence, in an optional embodiment the method further comprises comparing the baseline distance between the current camera view and the reference camera view with zero and comparing the baseline distance between the first camera view and the first reference camera view zero. If any of the baseline distances is zero step S3 determines the scaling factor to be equal to the fixed predefined value, preferably one. Otherwise, i.e. non-zero baseline distances, step S3 determines the scaling factor to be based on the baseline distances, such as based on a quotient thereof.

In a particular embodiment, the scaling factor determined in step S3 is calculated using view order indices of the current camera view, the reference camera view, the first camera view and the first reference camera view. In an embodiment, the view order index is like a counter, counting the camera views from left to right. If the camera spacing is uniform the difference between two view order indices is equivalent to a normalized baseline distance.

Hence, in this embodiment the baseline distances are preferably determined based on a difference the camera view index of the current camera view (CVOIdx) and the camera view index of the reference camera view (RfVOIdx) and based on a difference between the camera view index of the first camera view (FVOIdx) and the camera view index of the first reference camera view (FRfVOIdx). In an embodiment, the scaling factor is determined in step S3 to be based on $$\frac{tb}{td},$$

wherein tb=CVOIdx−RfVOIdx and td=FVOIdx−FRVOIdx.

In a particular embodiment, a clipping of the baseline distances are performed, such as tb=Clip3(−128, 127, CVOIdx−RfVOIdx) and td=Clip3(−128, 127, FVOIdx−FRfVOIdx). The clipping function Clip3(a, b, c) outputs a if c<a, outputs b if c>b and otherwise outputs c.

In an embodiment the scaling factor is determined in step S3 based on (tb×tx+$2^5$)>>6, wherein >> denotes a right shift operator and $$tx = \frac{2^{14} + \left|\frac{td}{2}\right|}{td} = \frac{2^{14} + |td| >> 1}{td}.$$

Optional clipping can be performed, such as Clip3=(−1024, 1023, (tb×tx+$2^5$)>>6).

In another particular embodiment a composite or multi-component scaling factor can be determined for the at least one candidate MV predictor. Such a scaling factor could then be based on, preferably equal to, α×β, wherein α is determined based on the baseline distance between the current camera view and the reference camera view and the baseline distance between the first camera view and the first reference camera view, and $$\beta = \frac{CV - RV}{V1 - RV1},$$

wherein CV denotes the current camera view, RV denotes the reference camera view, V1 denotes the first camera view and RV1 denotes the first reference camera view. In a preferred embodiment $$\alpha = \frac{BL_C}{BL_1}$$

and in another embodiment $$\alpha = \frac{BL_1}{BL_C},$$

wherein $BL_C$ denotes the baseline between the current camera view and the reference camera view and $BL_1$ baseline distance between the first camera view and the first reference camera view.

The camera view parameters are typically identifiers or numbers of the camera views and can be determined based on a geometrical relationship of the current camera view, the reference camera view and the camera views of the first frame and the first reference frame. For instance, the camera views can be indexed or numbered in a linear way if the camera positions vary linearly with the index. In a more general way, the camera view parameters is defined based on geometric camera positions, such as based on camera distances, and optionally including three-dimensional geometries to handle camera tilt or rotation.

In a specific case with uniform camera spacing and with camera views increasing when traveling along the camera views, such as from left to right or vice versa, the parameter β mentioned above will in fact be a representation of a quotient of the baseline distance between the current camera view and the reference camera view and the baseline distance between the first camera view and the first reference camera view. In such a case, no composite scaling factor α×β is preferably calculated but rather the parameter α or indeed the parameter β could be calculated as scaling factor for a candidate MV predictor.

In another embodiment that can be combined with any of the embodiments disclosed in the foregoing, a composite scaling factor is determined in step S3, basically comprising at least a first scaling factor that is dependent on baseline distances and a second scaling factor that is dependent on reference distances, such as differences in POC values of the current frame (current POC), the reference frame (reference POC), the first frame (first POC) and the first reference frame (first reference POC).

In an embodiment, the method involves comparing the current POC to the reference POC and comparing the first POC with the first reference POC. If the current POC is different from the reference POC and the first POC is different from the first reference POC step S3 preferably comprises calculating the scaling factor to be based on α×χ. The parameter α is determined as discussed above based on baseline distances, whereas the parameter χ is determined based on the POC values. In a particular embodiment $$\chi = \frac{CurrPOC - CurrRfPOC}{RfPOC - RfRfPOC}.$$

A problem of the prior art when applying motion vector prediction to multi-view video coding is that the previously discussed scaling formula used in prior art MV prediction can result in zero or indefinite scaling factors depending on the POCs of the current frame, the reference frame and the frames of the MV predictor. In the embodiment mentioned above a preferred verification is first conducted to verify that CurrPOC≠CurrRfPOC and RfPOC≠RfRfPOC.

In an embodiment, if CurrPOC=CurrRfPOC and/or RfPOC=RfRfPOC step S3 preferably determines the scaling factor to be based on k×α. This parameter k is then a fixed predefined value, preferably equal to one. The parameter α is determined as disclosed in the foregoing.

The above described embodiments of determining the scaling factor based on baseline distances (parameter α) and based on reference distances (parameter χ or parameter k) can also be combined with basing the determination of the scaling factor also based on view distances (parameter β), such as k×α×β or α×β×χ.

When a current inter-view motion vector is predicted from an inter-view MV predictor and applying the prior art formula of calculating scaling factor a scaling factor of zero and thereby a zero MV predictor can be obtained, which is usually undesirable. Even worse, division by zero is possible which result in an unresolved value that will lead to coder crash. The embodiments mentioned above solve these problems by setting the scaling factor to a fixed predefined value in special cases where problems otherwise can occur.

Figure 5:
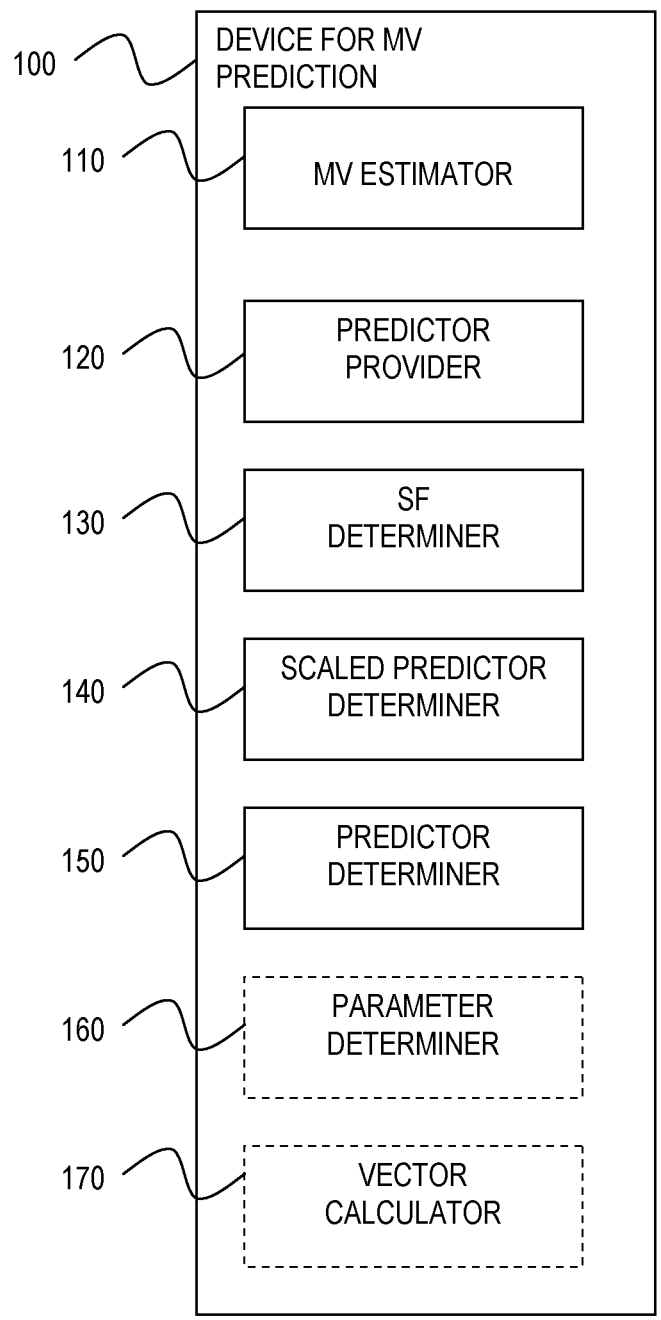
FIG. 5 is a schematic block diagram of a device for motion vector prediction according to an embodiment.

FIG. 5 is a schematic block diagram of an embodiment of a device 100 for MV prediction for multi-view video coding according to the third aspect. The device 100 comprises a MV estimator or predictor 110 configured to estimate or predict a motion vector for a current pixel block in a current frame of a current camera view. The estimated motion vector identifies, as previously disclosed herein, a reference pixel area in a reference frame of a reference camera view. The current camera view and the reference camera view are, in an embodiment, different camera views.

A predictor provider 120 is configured to provide at least one candidate motion vector predictor associated with a pixel block in a first frame of a first camera view and identifying a pixel area in a first reference frame of a first reference camera view. The predictor provider 120 preferably provides at least one candidate MV from the previously mentioned set. In an embodiment, the predictor provider 120 could provide candidate MV predictors without any discrimination of candidate MV predictors based on MV type. In an alternative approach, the predictor provider 120 determine a MV type from multiple predefined MV types for the motion vector predicted by the MV predictor 110. The predictor provider 120 performs this type determination based on at least one of the current camera view and the camera view of the reference frame and the point in time of the current frame and the point in time of the reference frame as previously disclosed herein. In such a case, the predictor provider 120 preferably provides at least one candidate MV predictor of the determined MV type.

The device 100 also comprises a SF determiner 130 configured to determine a respective scaling factor for the at least one candidate MV predictor provided by the predictor provider 120. The SF determiner 130 is configured to determine the scaling factor to be based on the baseline distance between the current camera view and the reference camera view and the baseline distance between the first camera view and the first reference camera view.

The scaling factor determined by the SF determiner 130 is then employed to scale the associated candidate MV predictor to form a scaled candidate MV predictor by a scaled predictor determiner 140. This scaled candidate MV predictor is preferably obtained based on multiplying the candidate MV predictor with the determined scaling factor. A predictor determiner 150 then determines a MV predictor for the motion vector among the scaled candidate MV predictors determined by the scaled predictor determiner 140. The predictor determiner 150 preferably performs this motion vector determination or selection based on the previously discussed rate-distortion metric or criterion.

In a particular embodiment, the SF determiner 130 is configured to determine the scaling factor based on a quotient between the baseline distance between the current view and the reference view and the baseline distance between the first view and the first reference view.

In an optional embodiment, the SF determiner 130 compares the baseline distances to zero and if any of the baseline distances is equal to zero the SF determiner 130 determines the scaling factor to be equal to a fixed predefined value, such as one.

In a particular embodiment, the SF determiner 130 is configured to determine the scaling factor based on the quotient $$\frac{tb}{td},$$

such as based on $(tb \times tx + 2^5) >> 6$. Optional clipping can be performed by the SF determiner 130 on the parameters tb, td and the scaling factor as previously disclosed herein.

In various embodiments, the SF determiner 130 could be configured to determine the scaling factor to be based on or equal to $\alpha \times \beta$ in order to make the scaling factor a function of view distances and baseline distances, based on or equal to $k \times \alpha$ or $\alpha \times \chi$ in order to make the scaling factor a function of reference distances and baseline distances or based on or equal to $k \times \alpha \times \beta$ or $\alpha \times \beta \times \chi$ in order to make the scaling factor a function of reference distance, view distances and baseline distances.

The device 100 optionally comprises a vector calculator 170 configured to calculate a residual motion vector based on the current motion vector and the motion vector predictor determined by the predictor determiner 150.

In an optional embodiment, the device 100 comprises an optional parameter determiner 160 configured to determine the view parameters CV, RV, V1 and RV1 based on a geometric relationship of the current camera view, the reference camera view, the camera view of the first frame and the camera view of the first reference frame.

The device 100 can be implemented in hardware, in software or a combination of hardware and software. The device 100 can be implemented in a user equipment, such as a mobile telephone, tablet, desktop, notebook, multimedia player, video streaming server, set-top box or computer. The device 100 may also be implemented in a network device in the form of or connected to a network node, such as radio base station, in a communication network or system. The device 100 is advantageously implemented as a part of an encoder for encoding multi-view video content.

Although the respective unit 110-170 disclosed in conjunction with FIG. 5 have been disclosed as physically separate units 110-170 in the device 100, and all may be special purpose circuits, such as ASICs (Application Specific Integrated Circuits), alternative embodiments of the device 100 are possible where some or all of the units 110-170 are implemented as computer program modules running on a general purpose processor. Such an embodiment is disclosed in FIG. 6.

Figure 6:
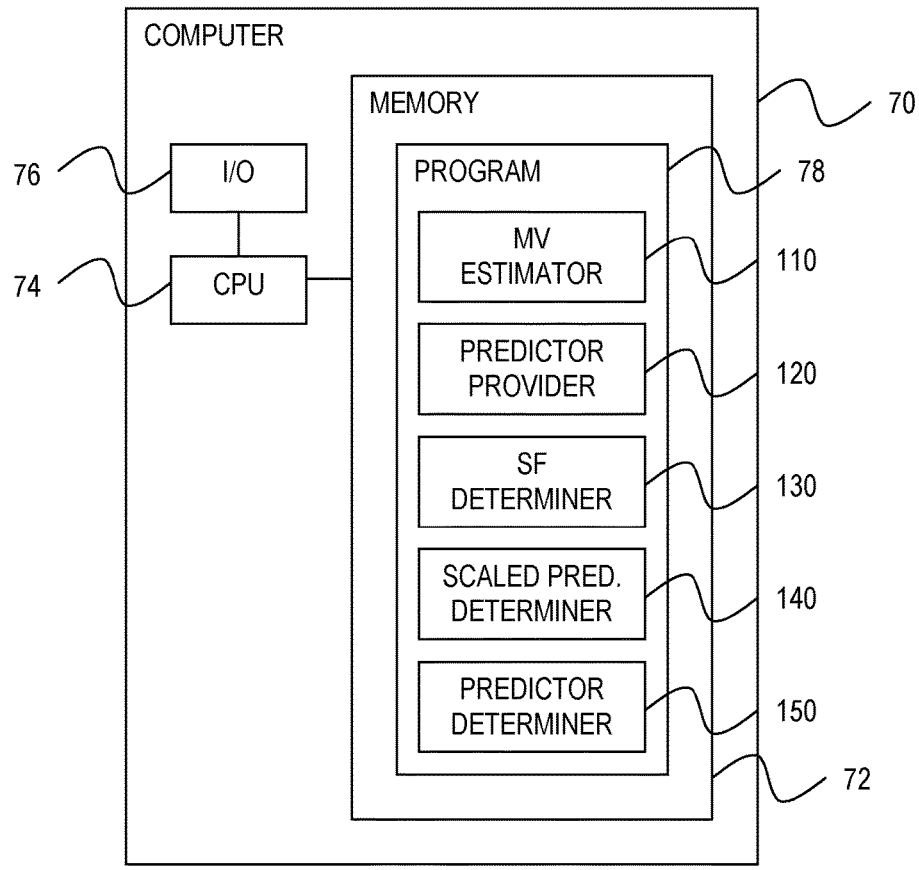
FIG. 6 is a schematic block diagram illustrating a computer comprising a computer program product with a computer program for motion vector prediction according to an embodiment.

FIG. 6 schematically illustrates an embodiment of a computer 70 having a processing unit 74, such as a DSP (Digital Signal Processor) or CPU (Central Processing Unit). The processing unit 74 can be a single unit or a plurality of units for performing different steps of the method described herein. The computer 70 also comprises an input/output (I/O) unit 76 for receiving recorded or generated video frames of the multiple views and outputs motion vector predictors, or an encoded bitstream of encoded multi-view video content. The I/O unit 76 has been illustrated as a single unit in FIG. 6 but can likewise be in the form of a separate input unit and a separate output unit.

Furthermore, the computer 70 comprises at least one computer program product in the form of a non-volatile memory 72, for instance an EEPROM (Electrically Erasable Programmable Read-Only Memory), a flash memory or a disk drive. The computer program product comprises a computer program 78, which comprises code means which when run on or executed by or on the computer 70, such as by the processing unit 94, causes the computer 70 to perform the steps of the method described in the foregoing in connection with FIG. 4. Hence, in an embodiment the code means in the computer program 88 comprises a MV estimating or predicting module or MV estimator or predictor 110 for estimating or predicting a motion vector, a predictor providing module or predictor provider 120 for providing at least one candidate MV predictor, a SF determining module or SF determiner 130 for determining a scaling factor, a scaled predictor determining module or scaled predictor determiner 140 for determining a scaled candidate MV predictor and a predictor determining module or predictor determiner 150 for determining the MV predictor. These modules 110-150 essentially perform the steps of the flow diagram in FIG. 4 when run on the processing unit 74. Thus, when the different modules 110-150 are run on the processing unit 74 they correspond to the corresponding units 110-150 of FIG. 5.

The computer program 78 may additionally comprise a vector calculating module or vector calculator and/or a parameter determining module or parameter determiner as disclosed in connection with FIG. 5.

Figure 8:
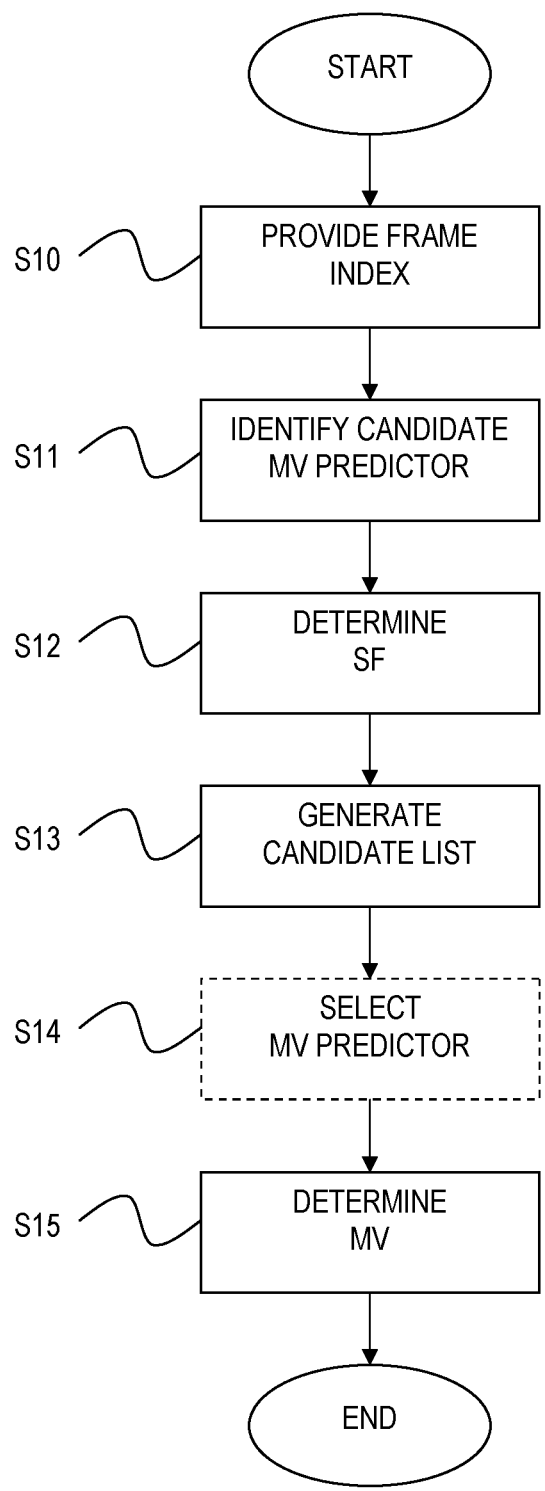
FIG. 8 is a flow diagram illustrating a method of motion vector decoding according to an embodiment.

A related aspect of the embodiments defines a method of motion vector decoding for encoded multi-view video. FIG. 8 is a flow diagram illustrating such a method. The method starts in step S10 by providing a reference frame index for a current pixel block to be decoded in a current frame of a current camera view. This reference frame index identifies a reference frame for the current pixel block and where this reference frame comprises a pixel area that is to be used as a predictor for the current pixel block during the decoding. The reference frame index is generally retrieved from the bitstream and in more detail from the encoded representation of the current pixel block or the encoded representation of the current frame.

A next step S11 identifies at least one candidate MV predictor for the current pixel block. This step S11 is basically performed as previously discussed herein in connection with step S2 in FIG. 4. Hence, in a particular embodiment a set of at least one, but preferably multiple, candidate MV predictors is provided based on a position of the current pixel block to be decoded in the current frame, the point in time of the current frame and the current camera view. Step S11 can be performed without any regard to MV type. In an alternative approach, a MV type is determined for the current pixel block based on i) the current view and the reference camera view and/or ii) the point in time of the current frame and the point in time of the reference frame. In such a case, the identification of at least one candidate MV predictor in step S11 is preferably conducted only among candidate MV predictors of the determined MV type.

A next step S12 determines a respective scaling factor for each identified candidate MV predictor. Such a scaling factor is determined based on the baseline distance between the current camera view and the reference camera view and the baseline distance between the first camera view and the first reference camera view. Step S12 is basically performed as previously disclosed herein in connection with step S3 of FIG. 4. A next step S13 generates a candidate list of at least one scaled candidate MV predictor, which is obtained based on the candidate MV predictor and the scaling factor determined for the candidate MV predictor in step S12. Such a scaled candidate MV predictor is then obtained based on multiplying the candidate MV predictor with the scaling factor determined for the candidate MV predictor in step S12.

Finally, step S15 determines a motion vector for the current pixel block based on a scaled candidate MV predictor of the candidate list generated in step S13. The motion vector determined in step S15 then enables identification of the pixel area in the reference frame that is to be used as a predictor for the current pixel block. Thus, the pixel values of the current pixel block are then preferably obtained by adding the pixel values of the identified pixel area to residual pixel values obtained from the bitstream and preferably from the encoded representation of the current pixel block.

In a particular embodiment, the method of FIG. 8 comprises an additional step S14. This optional step S14 selects a MV predictor for the current pixel block from the at least one scaled candidate MV predictor listed in the candidate list. This MV predictor is preferably selected based on a predictor index associated with the current pixel block and included in the bitstream, such as in the encoded representation of the current pixel block. In such a case, step S15 determines a motion vector for the current pixel block based on the MV predictor selected in step S14 and a residual motion vector associated with the current pixel block. This residual motion vector is obtained from the bitstream and preferably from the encoded representation of the current pixel block.

In other embodiments, no residual motion vector is included for the current pixel block in the bitstream. For instance, according to the skip mode there is no residual motion vector that will refine the MV predictor for the pixel block. In clear contrast, one or several of the scaled MV predictors from the candidate list generated in step S13 will be used as basis for the motion vector determined in step S15 for the pixel block. For instance, the candidate list could include scaled motion vector associated with spatially neighboring pixel blocks in the current frame, associated with temporally neighboring pixel blocks in other frames than the current frame but in the current camera view and/or associated with pixel blocks present in frames having a same point of time as the current frame but belonging to other camera views that the current camera view. In such a case, the motion vector of the pixel block could be determined based on at least one of these candidate MV predictors multiplied by a respective scaling factor as disclosed herein. In an embodiment, the motion vector is determined to be equal to or at least based on the median MV of the at least one candidate MV predictors or the average MV of the at least one candidate MV predictors. Thus, in an embodiment, the MV determined in step S15 could be the H.264 median predictor but where this H.264 median predictor is scaled by a scaling factor that is based on baseline distances.

The scaling factor determined in step S12 is preferably determined based on a quotient of the baseline distances as previously disclosed herein. In an optional embodiment, the method further comprises comparing the baseline distances with zero. If any of the baseline distances is equal to zero step S12 preferably determines the scaling factor for the particular candidate MV predictor to be equal to a fixed predefined value, such as one as previously disclosed herein.

In an embodiment of step S12, the scaling factor is determined based on the quotient $$\frac{tb}{td},$$

such as based on $(tb \times tx + 2^5) \gg 6$. Optional clipping can be performed in step S12 on the parameters tb, td and the scaling factor as previously disclosed herein.

In a particular embodiment, the scaling factor could be determined to be a composite scaling factor to thereby not only be based on baseline distances but also be based on reference distances and/or view distances as previously discussed herein, i.e. based on and preferably equal to $\alpha \times \beta$, $k \times \alpha$, $\alpha \times \chi$, $k \times \alpha \times \beta$ or $\alpha \times \beta \times \chi$.

Figure 9:
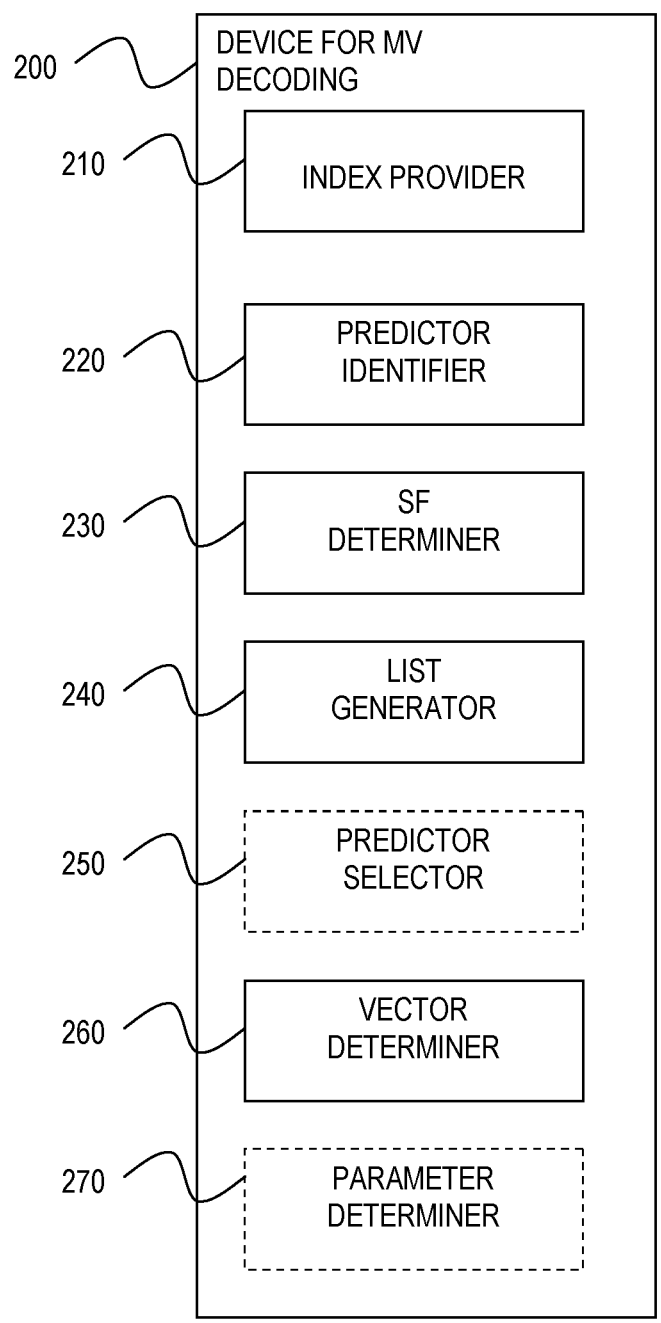
FIG. 9 is a schematic block diagram of a device for motion vector decoding according to an embodiment.

FIG. 9 is a schematic block diagram of a device 200 for motion vector decoding of encoded multi-view video. The device 200 comprises an index provider 210 configured to provide a reference frame index for a current pixel block to be decoded in a current frame of a current camera view. The index provider 210 typically retrieves this reference frame index from the bitstream and in particular from the encoded representation of the pixel block or of the current frame. This reference frame index is employed in order to identify a reference frame comprising a pixel area that is to be used as a predictor for the pixel values of the current pixel block.

A predictor identifier 220 is implemented in the device 200 to identify or provide at least one candidate MV predictor as previously disclosed herein. In an embodiment, the predictor identifier 220 provides a set of candidate MV predictors based on the position of the current pixel block in the current frame, the point in time of the current frame and the current camera view. The predictor identifier 220 could identify candidate MV predictor(s) regardless of MV type or first determine the MV type of the motion vector for the current pixel block. In the latter case, preferably only candidate MV predictors of this determined MV type are identified by the predictor identifier 220.

A SF determiner 230 of the device 200 operates as previously disclosed herein in connection with the SF determiner 130 of FIG. 5. Thus, the SF determiner 230 determines scaling factors for the candidate MV predictors identified by the predictor identifier 220 and where these scaling factors are based on baseline distances of the camera views.

The SF determiner 230 preferably determines the scaling factor as a quotient between the baseline distance of the current view and the reference view and the baseline distance of the first frame and the first reference frame. The SF determiner 230 optionally compares the baseline distances to zero and if any of the baseline distances is equal to zero the SF determiner 230 determines the scaling factor to be equal to a predefined fixed value, such as one.

The SF determiner 230 could determine the scaling factor based on the quotient $$\frac{tb}{td},$$

such as based on $(tb \times tx + 2^5) >> 6$. Optional clipping can be performed by the SF determiner 230 on the parameters tb, td and the scaling factor as previously disclosed herein.

Furthermore, the SF determiner 230 could also determine the scaling factor based on reference distances ($k \times \alpha$ or $\alpha \times \chi$) and/or view distances ($\alpha \times \beta$; one of $k \times \alpha \times \beta$ and $\alpha \times \beta \times \chi$) as previously disclosed herein.

A list generator 240 then generates a candidate list comprising at least one but preferably multiple scaled candidate MV predictors formed based on the at least one candidate MV predictor multiplied by the respective scaling factor. The device 200 also comprises a vector determiner 260 is configured to determine a motion vector for the current pixel block based on a scaled candidate MV predictor of the candidate list.

In a particular embodiment, the device 200 comprises a predictor selector 250 that is configured to select a MV predictor for the current pixel block from the candidate list generated by the list generator 240. The predictor selector 250 advantageously retrieves and decodes a predictor index from the bitstream, such as from the encoded representation of the current pixel block. This predictor index is then used in order to select the MV predictor from the candidate list. In this embodiment, the vector determiner 260 is configured to determine the motion vector for the current pixel block based on the MV predictor selected by the predictor selector 250 and a residual motion vector associated with the current pixel block and preferably retrieved from the encoded bitstream, such as from the encoded representation of the current pixel block as previously disclosed herein.

In other embodiment, such as operating in a skip decoding mode the vector determiner 260 preferably determines the motion vector without any MV residual as previously disclosed herein.

The SF determiner 230 optionally determines a composite scaling factor as previously disclosed herein or a scaling factor that is not only dependent on the baseline distances but also dependent on reference distances and/or view distances.

An optional parameter determiner 270 can be implemented in the device 200 and then operates as previously disclosed herein in connection with the parameter determiner 160 of FIG. 5.

The device 200 can be implemented in hardware, in software or a combination of hardware and software. The device 200 can be implemented in a user equipment, such as a mobile telephone, tablet, desktop, notebook, multimedia player, video streaming server, set-top box or computer. The device 200 may also be implemented in a network device in the form of or connected to a network node, such as radio base station, in a communication network or system. The device 200 is advantageously implemented as a part of a decoder for decoding encoded multi-view video content.

Although the respective unit 210-270 disclosed in conjunction with FIG. 9 have been disclosed as physically separate units 210-270 in the device 200, and all may be special purpose circuits, such as ASICs (Application Specific Integrated Circuits), alternative embodiments of the device 200 are possible where some or all of the units 210-270 are implemented as computer program modules running on a general purpose processor. Such an embodiment is disclosed in FIG. 10.

Figure 10:
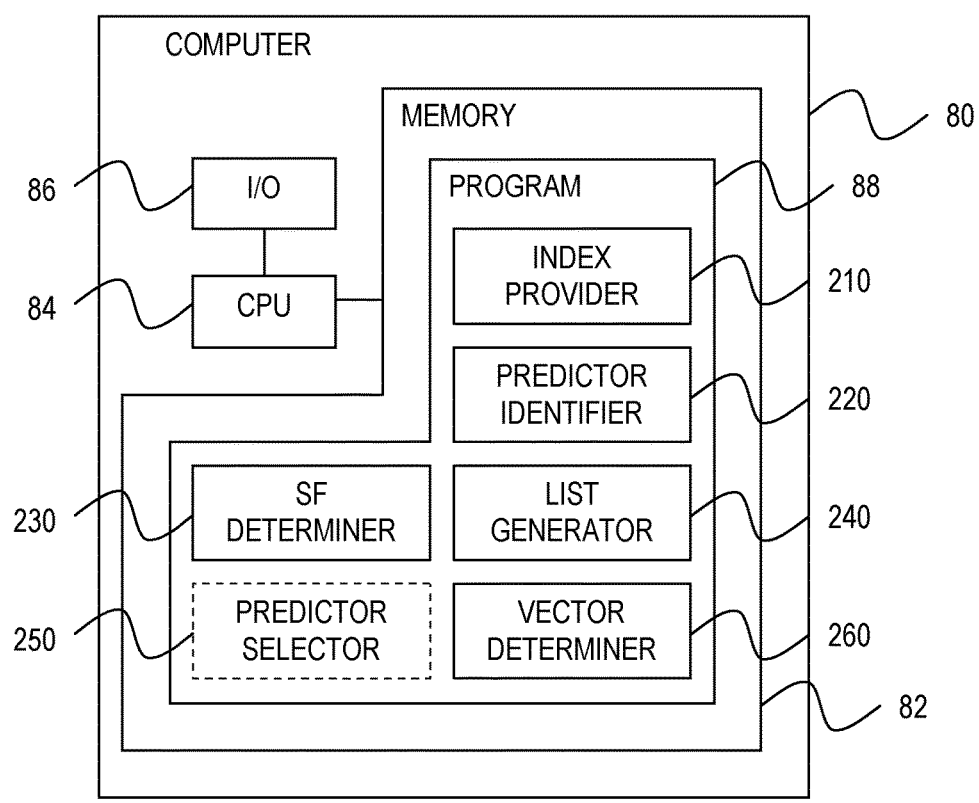
FIG. 10 is a schematic block diagram illustrating a computer comprising a computer program product with a computer program for motion vector decoding according to an embodiment.

FIG. 10 schematically illustrates an embodiment of a computer 80 having a processing unit 84, such as a DSP (Digital Signal Processor) or CPU (Central Processing Unit). The processing unit 84 can be a single unit or a plurality of units for performing different steps of the method described herein. The computer 80 also comprises an input/output (I/O) unit 86 for receiving an encoded bitstream of encoded pixel block representations and outputs determined motion vectors, or decoded pixel values. The I/O unit 86 has been illustrated as a single unit in FIG. 10 but can likewise be in the form of a separate input unit and a separate output unit.

Furthermore, the computer 80 comprises at least one computer program product in the form of a non-volatile memory 82, for instance an EEPROM (Electrically Erasable Programmable Read-Only Memory), a flash memory or a disk drive. The computer program product comprises a computer program 88, which comprises code means which when run on or executed by or on the computer 80, such as by the processing unit 84, causes the computer 80 to perform the steps of the method described in the foregoing in connection with FIG. 8. Hence, in an embodiment the code means in the computer program 88 comprises an index providing module or index provider 210 for providing a reference frame index, a predictor identifying module or predictor identifier 220 for identifying candidate MV predictors, a SF determining module or SF determiner 230 for determining a scaling factor, a list generating module or list generator 240 for generating a candidate list, an optional predictor selecting module or predictor selector 250 for selecting a MV predictor and a vector determining module or vector determiner 260 for determining a motion vector. These modules 210-260 essentially perform the steps of the flow diagram in FIG. 8 when run on the processing unit 84. Thus, when the different modules 210-260 are run on the processing unit 84 they correspond to the corresponding units 210-260 of FIG. 9.

The computer program 88 may additionally comprise a parameter determining module or parameter determiner as disclosed in connection with FIG. 9.

Figure 11:
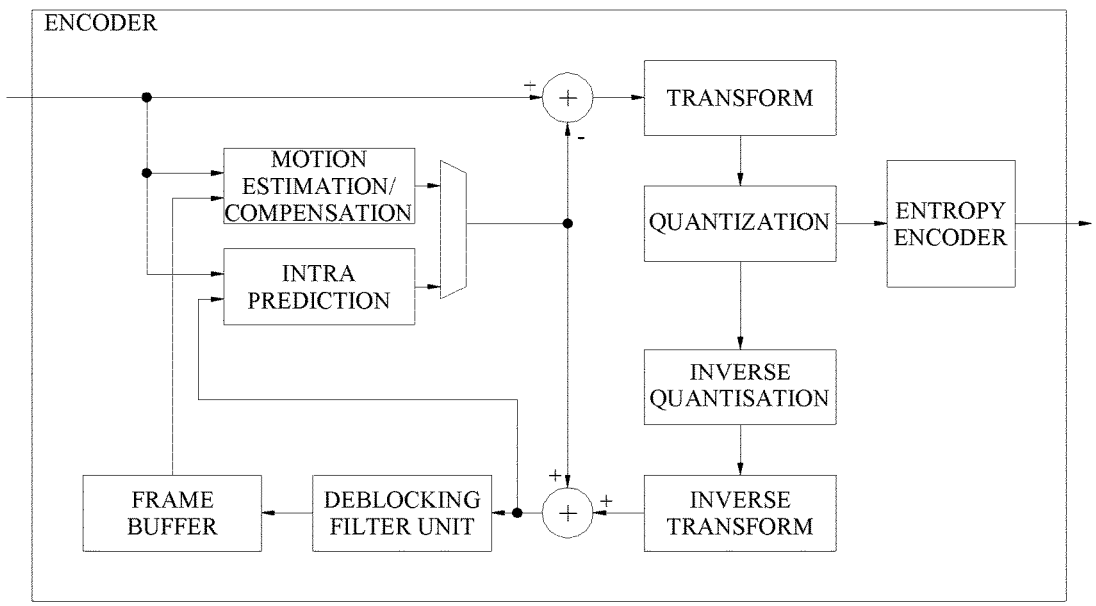
FIG. 11 is a schematic block diagram illustrating an encoder according to an embodiment.

FIG. 11 is a schematic block diagram of an encoder for encoding a pixel blocks for multi-view video according to an embodiment.

A current pixel block is predicted by performing a motion prediction or estimation by a motion estimator or predictor from an already provided pixel blocks in the same frame or in a previous frame of the current camera view or of another camera view. The result of the motion prediction is a motion vector identifying a pixel area in a reference frame in the case of inter prediction. The motion vector is utilized by a motion compensator for outputting an inter prediction of the pixel block.

An intra predictor computes an intra prediction of the current pixel block. The outputs from the motion estimator/compensator and the intra predictor are input in a selector that either selects intra prediction or inter prediction for the current block of pixels. The output from the selector is input to an error calculator in the form of an adder that also receives the pixel values of the current pixel block. The adder calculates and outputs a residual error as the difference in pixel values between the current pixel block of pixels and its predictor.

The error is transformed in a transformer, such as by a discrete cosine transform, and quantized by a quantizer followed by coding in an encoder, such as by entropy encoder. In inter coding, also the estimated motion vector is brought to the encoder for generating the coded representation of the current pixel block. This (entropy) encoder then comprises at least a portion of the units of device for MV prediction according to FIG. 5 or can operate with a program as disclosed in FIG. 6. The MV predictor of the device for MV prediction can be implemented as the motion estimator/compensator.

The transformed and quantized residual error for the current pixel block is also provided to an inverse quantizer and inverse transformer to retrieve the original residual error. This error is added by an adder to the pixel block predictor output from the motion compensator or the intra predictor to create a reference pixel block that can be used in the prediction and coding of a next pixel block. This new reference pixel block is optionally first processed by a filtering control device to determine whether de-blocking filtering will be applied and in such a case what type of de-blocking filter to use. The processed new reference pixel block is then temporarily stored in a frame buffer, where it is available to the intra predictor and the motion estimator/compensator.

Figure 12:
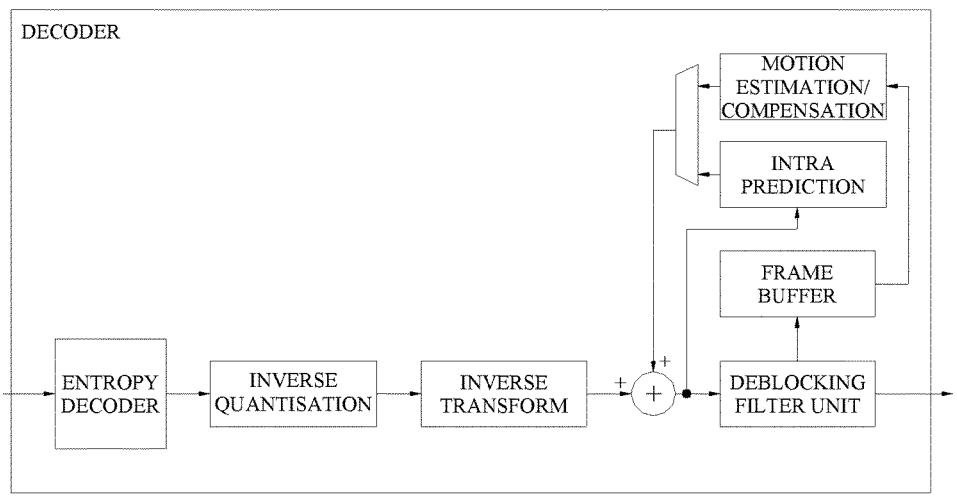
FIG. 12 is a schematic block diagram illustrating a decoder according to an embodiment.

FIG. 12 is a corresponding schematic block diagram of a decoder according to an embodiment. The decoder comprises a decoder, such as entropy decoder, for decoding an encoded representation of a pixel block to get a set of quantized and transformed residual errors. The decoder preferably comprises a device for motion vector decoding according to FIG. 9 or can operate with a program as disclosed in FIG. 10. These residual errors are dequantized in an inverse quantizer and inverse transformed by an inverse transformer to get a set of residual errors.

These residual errors are added in an adder to the pixel values of a reference pixel block or pixel area. The reference block is determined by a motion estimator/compensator (or motion predictor/compensator) or intra predictor, depending on whether inter or intra prediction is performed. A selector is thereby interconnected to the adder and the motion estimator/compensator and the intra predictor. The resulting decoded pixel block output form the adder is input to an optional filtering control device in order to de-blocking filter any blocking artifacts. The filtered pixel block is output form the decoder and is furthermore preferably temporarily provided to a frame buffer and can be used as a reference block of pixels for a subsequent block of pixels to be decoded. The frame buffer is thereby connected to the motion estimator/compensator to make the stored blocks of pixels available to the motion estimator/compensator.

The output from the adder is preferably also input to the intra predictor to be used as an unfiltered reference pixel block.

Figure 13:
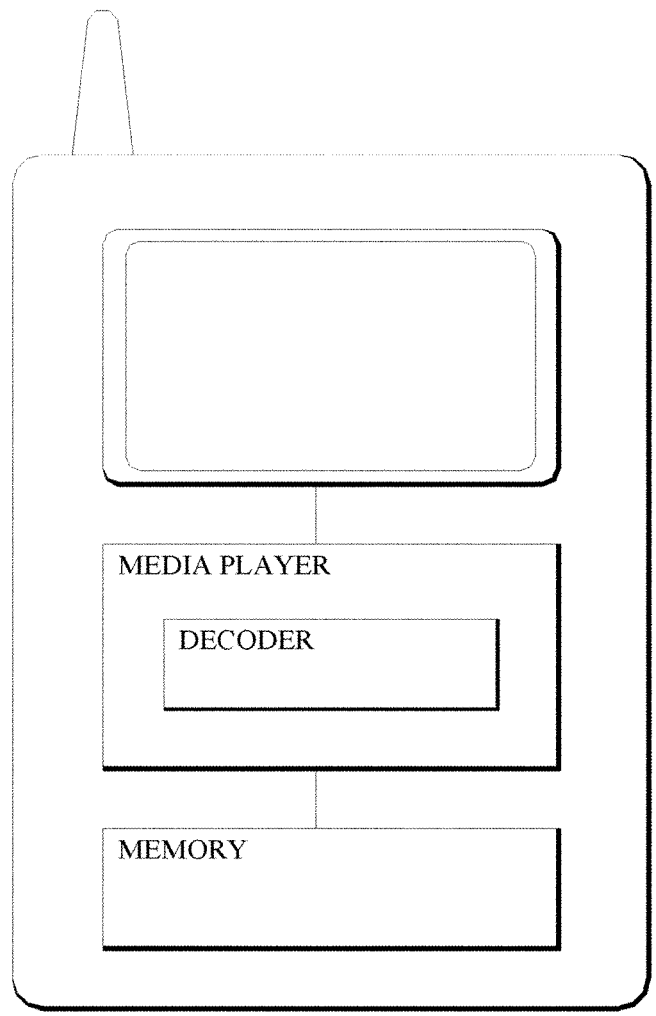
FIG. 13 is a schematic block diagram of a media terminal exemplified by a user equipment according to an embodiment.

FIG. 13 is a schematic block diagram of a media terminal housing a decoder with a device for motion vector decoding. The media terminal can be any device having media decoding functions that operates on an encoded video stream of encoded multi-view video frames to thereby decode the video frames and make the video data available. Non-limiting examples of such devices include mobile telephones and other portable media players, computers, decoders, game consoles, etc. The media terminal comprises a memory configured to store encoded video frames. These encoded video frames can have been generated by the media terminal itself. In such a case, the media terminal preferably comprises a media engine or recorder together with a connected encoder, such as the encoder of FIG. 23. Alternatively, the encoded video frames are generated by some other device and wirelessly transmitted or transmitted by wire to the media terminal. The media terminal then comprises a transceiver (transmitter and receiver) or input and output port to achieve the data transfer.

The encoded video frames are brought from the memory to a decoder, such as the decoder illustrated in FIG. 12. The decoder then decodes the encoded video frames into decoded video frames. The decoded video frames are provided to a media player that is configured to render the decoded video frames into video data that is displayable on a display or screen of or connected to the media terminal.

In FIG. 13, the media terminal has been illustrated as comprising both the decoder and the media player, with the decoder implemented as a part of the media player. This should, however, merely be seen as an illustrative but non-limiting example of an implementation embodiment for the media terminal. Also distributed implementations are possible where the decoder and the media player are provided in two physically separated devices are possible and within the scope of media terminal as used herein. The display could also be provided as a separate device connected to the media terminal, where the actual data processing is taking place.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

REFERENCES

[1] Jung and Laroche, Competition-Based Scheme for Motion Vector Selection and Coding, ITU—Telecommunications Standardization Sector, Study Group 16 Question 16, VCEG-AC06, 17-18 Jul. 2006

The invention claimed is:
1. A method of motion vector prediction for multi-view video coding of video content from multiple camera views, said method comprising:
   estimating, for a current pixel block in a current frame of a current camera view of said multiple camera views, a motion vector identifying a reference pixel area in a reference frame of a reference camera view of said multiple camera views, said current camera view being different from said reference camera view;
   providing at least one candidate motion vector predictor associated with a pixel block in a first frame of a first camera view of said multiple camera views and identifying a pixel area in a first reference frame of a first reference camera view of said multiple camera views, said first camera view being different from said first reference camera view;
   determining a scaling factor, for said at least one candidate motion vector predictor, based on a baseline distance between said current camera view and said reference camera view and a baseline distance between said first camera view and said first reference camera view;
   determining, for said at least one candidate motion vector predictor, a scaled candidate motion vector predictor based on said candidate motion vector predictor multiplied by said scaling factor; and
   determining a motion vector predictor for said motion vector based on said at least one scaled candidate motion vector predictor.

2. The method of claim 1, wherein determining said scaling factor comprises determining said scaling factor, for said at least one candidate motion vector predictor, based on a quotient between said baseline distance between said current camera view and said reference camera view and said baseline distance between said first camera view and said first reference camera view.

3. The method of claim 2, wherein determining said scaling factor comprises determining said scaling factor to be equal to a fixed predefined value in the event that i) said baseline distance between said current camera view and said reference camera view is zero or ii) said baseline distance between said first camera view and said first reference camera view is zero.

4. The method of claim 1, further comprising calculating a residual motion vector based on said motion vector and said motion vector predictor.

5. The method of claim 1, wherein determining said scaling factor comprises determining said scaling factor, for said at least one candidate motion vector predictor, to be equal to $(tb \times tx + 2^5) \gg 6$, wherein $\gg$ denotes a right shift operation, $$tx = \frac{2^{14} + \left|\frac{td}{2}\right|}{td},$$

tb=CVOIdx−RfVOIdx and td=FVOIdx−FRVOIdx and CVOIdx denotes a view order index of said current camera view, RfVOIdx denotes a view order index of said reference camera view, FVOIdx denotes a view order index of said first camera view and FRfVOIdx denotes a camera view order index of said first reference camera view.

6. A non-transitory computer-readable medium comprising, stored thereupon, a computer program for predicting motion vector for multi-view video coding of video content from multiple camera views, said computer program comprising code that, when run on a computer, causes said computer to:
estimate, for a current pixel block in a current frame of a current camera view of said multiple camera views, a motion vector identifying a reference pixel area in a reference frame of a reference camera view of said multiple camera views, said current camera view being different from said reference camera view;
provide at least one candidate motion vector predictor associated with a pixel block in a first frame of a first camera view of said multiple camera views and identifying a pixel area in a first reference frame of a first reference camera view of said multiple camera views, said first camera view being different from said first reference camera view;
determine a scaling factor for said at least one candidate motion vector predictor based on a baseline distance between said current camera view and said reference camera view and a baseline distance between said first camera view and said first reference camera view;
determine, for said at least one candidate motion vector predictor, a scaled candidate motion vector predictor based on said candidate motion vector predictor multiplied by said scaling factor; and
determine a motion vector predictor for said motion vector based on said at least one scaled candidate motion vector predictor.

7. A device for motion vector prediction for multi-view video coding of video content from multiple camera views, said device comprising a processing circuit that comprises an application-specific integrated circuit and/or a processor and an associated memory circuit, the processing circuit being configured to:
estimate, for a current pixel block in a current frame of a current camera view of said multiple camera views, a motion vector identifying a reference pixel area in a reference frame of a reference camera view of said multiple camera views, said current camera view being different from said reference camera view;
provide at least one candidate motion vector predictor associated with a pixel block in a first frame of a first camera view of said multiple camera views and identifying a pixel area in a first reference frame of a first reference camera view of said multiple camera views, said first camera view being different from said first reference camera view;
determine a scaling factor for said at least one candidate motion vector predictor based on a baseline distance between said current camera view and said reference camera view and a baseline distance between said first camera view and said first reference camera view;
determine, for said at least one candidate motion vector predictor, a scaled candidate motion vector predictor based on said candidate motion vector predictor multiplied by said scaling factor; and
determine a motion vector predictor for said motion vector based on said at least one scaled candidate motion vector predictor.

8. The device of claim 7, wherein said processing circuit is configured to determine said scaling factor, for said at least one candidate motion vector predictor, based on a quotient between said baseline distance between said current camera view and said reference camera view and said baseline distance between said first camera view and said first reference camera view.

9. The device of claim 8, wherein said processing circuit is configured to determine said scaling factor to be equal to a fixed predefined value in the event that i) said baseline distance between said current camera view and said reference camera view is zero or ii) said baseline distance between said first camera view and said first reference camera view is zero.

10. The device of claim 7, wherein the processing circuit is further configured to calculate a residual motion vector based on said motion vector and said motion vector predictor.

11. The device of claim 7, wherein said processing circuit is configured to determine said scaling factor, for said at least one candidate motion vector predictor, to be equal to $(tb \times tx + 2^5) \gg 6$, wherein $\gg$ denotes a right shift operation, $$tx = \frac{2^{14} + \left|\frac{td}{2}\right|}{td},$$

tb=CVOIdx−RfVOIdx and td=FVOIdx−FRVOIdx and CVOIdx denotes a view order index of said current camera view, RfVOIdx denotes a view order index of said reference camera view, FVOIdx denotes a view order index of said first camera view and FRfVOIdx denotes a camera view order index of said first reference camera view.

12. A method of motion vector decoding for encoded multi-view video from multiple camera views, said method comprising:
provide, for a current pixel block in a current frame of a current camera view of said multiple camera views, a reference frame index identifying a reference frame of a reference camera view of said multiple camera views, said current camera view being different from said reference camera view;
identifying, for said current pixel block, at least one candidate motion vector predictor associated with a pixel block in a first frame of a first camera view of said multiple camera views and identifying a pixel area in a first reference frame of a first reference camera view of said multiple camera views, said first camera view being different from said first reference camera view;
determining, for said at least one candidate motion vector predictor, a respective scaling factor based on a baseline distance between said current camera view and said reference camera view and a baseline distance between said first camera view and said first reference camera view;
generating a candidate list comprising at least one scaled candidate motion vector predictor formed based on said at least one candidate motion vector predictor multiplied by said respective scaling factor; and
determining a motion vector for said current pixel block based on a scaled candidate motion vector predictor of said candidate list.

13. The method of claim 12, further comprising selecting a motion vector predictor from said candidate list for said current pixel block based on a predictor index associated with said current pixel block, wherein determining said motion vector comprises determining said motion vector for said current pixel block based on said selected motion vector predictor and a residual motion vector associated with said current pixel block.

14. The method of claim 12, wherein determining said respective scaling factor comprises determining said respective scaling factor, for said at least one candidate motion vector predictor, based on a quotient between said baseline distance between said current camera view and said reference camera view and said baseline distance between said first camera view and said first reference camera view.

15. The method of claim 14, wherein determining said respective scaling factor comprises determining said respective scaling factor, for said at least one candidate motion vector predictor, to be equal to a fixed predefined value in the event that i) said baseline distance between said current camera view and said reference camera view is zero or ii) said baseline distance between said first camera view and said first reference camera view is zero.

16. The method of claim 12, wherein determining said respective scaling factor comprises determining said respective scaling factor, for said at least one candidate motion vector predictor, to be equal to (tb×tx+$2^5$)>>6, wherein >> denotes a right shift operation, $$tx = \frac{2^{14} + \left|\frac{td}{2}\right|}{td},$$

tb=CVOIdx−RfVOIdx and td=FVOIdx−FRfVOIdx and CVOIdx denotes a view order index of said current camera view, RfVOIdx denotes a view order index of said reference camera view, FVOIdx denotes a view order index of said first camera view and FRfVOIdx denotes a camera view order index of said first reference camera view.

17. A non-transitory computer-readable medium comprising, stored thereupon, a computer program for decoding motion vector for encoded multi-view video from multiple camera views, said computer program comprising code that, when run on a computer, causes said computer to:
provide, for a current pixel block in a current frame of a current camera view of said multiple camera views, a reference frame index identifying a reference frame of a reference camera view of said multiple camera views, said current camera view being different from said reference camera view;
identify, for said current pixel block, at least one candidate motion vector predictor associated with a pixel block in a first frame of a first camera view of said multiple camera views and identifying a pixel area in a first reference frame of a first reference camera view of said multiple camera views, said first camera view being different from said first reference camera view;
determine, for said at least one candidate motion vector predictor, a respective scaling factor based on a baseline distance between said current camera view and said reference camera view and a baseline distance between said first camera view and said first reference camera view;
generate a candidate list comprising at least one scaled candidate motion vector predictor formed based on said at least one candidate motion vector predictor multiplied by said respective scaling factor; and
determine a motion vector for said current pixel block based on a scaled candidate motion vector predictor of said candidate list.

18. A device for motion vector decoding for encoded multi-view video from multiple camera views, said device comprising a digital processing circuit that comprises an application-specific integrated circuit and/or a processor and an associated memory circuit, the processing circuit being configured to:
provide, for a current pixel block in a current frame of a current camera view of said multiple camera views, a reference frame index identifying a reference frame of a reference camera view of said multiple camera views, said current camera view being different from said reference camera view;
identify, for said current pixel block, at least one candidate motion vector predictor associated with a pixel block in a first frame of a first camera view of said multiple camera views and identifying a pixel area in a first reference frame of a first reference camera view of said multiple camera views, said first camera view being different from said first reference camera view;
determine, for said at least one candidate motion vector predictor, a respective scaling factor based on a baseline distance between said current camera view and said reference camera view and a baseline distance between said first camera view and said first reference camera view;
generate a candidate list comprising at least one scaled candidate motion vector predictor formed based on said at least one candidate motion vector predictor multiplied by said respective scaling factor; and
determine a motion vector for said current pixel block based on a scaled candidate motion vector predictor of said candidate list.

19. The device of claim 18, wherein the processing circuit is further configured to select a motion vector predictor from said candidate list for said current pixel block based on a predictor index associated with said current pixel block, and to determine said motion vector for said current pixel block based on said motion vector predictor and a residual motion vector associated with said current pixel block.

20. The device of claim 18, wherein said processing circuit is configured to determine said respective scaling factor, for said at least one candidate motion vector predictor, based on a quotient between said baseline distance between said current camera view and said reference camera view and said baseline distance between said first camera view and said first reference camera view.

21. The device of claim 20, wherein said processing circuit is configured to determine said respective scaling factor, for said at least one candidate motion vector predictor, to be equal to a fixed predefined value in the event that i) said baseline distance between said current camera view and said reference camera view is zero or ii) said baseline distance between said first camera view and said first reference camera view is zero.

22. The device of claim 18, wherein said processing circuit is configured to determine said respective scaling factor, for said at least one candidate motion vector predictor to be equal to $(tb \times tx + 2^5) >> 6$, wherein $>>$ denotes a right shift operation, $$tx = \frac{2^{14} + \left|\frac{td}{2}\right|}{td},$$

tb=CVOIdx−RfVOIdx and td=FVOIdx−FRVOIdx and CVOIdx denotes a view order index of said current camera view, RfVOIdx denotes a view order index of said reference camera view, FVOIdx denotes a view order index of said first camera view and FRfVOIdx denotes a camera view order index of said first reference camera view.

* * * * *